United States Patent
Hirano et al.

(10) Patent No.: US 8,325,283 B2
(45) Date of Patent: Dec. 4, 2012

(54) RECORDING DEVICE, RECORDING APPARATUS, AND RECORDING METHOD COMPRISING LIQUID CRYSTALS AND A PHOTOSENSITIVE LAYER IN WHICH AN IMPEDANCE CHANGES DEPENDING ON AN IRRADIATED LIGHT

(75) Inventors: Atsushi Hirano, Ebina (JP); Taijyu Gan, Ebina (JP); Haruo Harada, Ebina (JP); Takashi Morikawa, Ebina (JP); Chisato Urano, Ebina (JP); Yasunori Okano, Tokyo (JP); Hiroshi Arisawa, Ebina (JP)

(73) Assignee: Fuji Xerox Co., Ltd., Tokyo (JP)

(*) Notice: Subject to any disclaimer, the term of this patent is extended or adjusted under 35 U.S.C. 154(b) by 421 days.

(21) Appl. No.: 12/610,658

(22) Filed: Nov. 2, 2009

(65) Prior Publication Data

US 2010/0259696 A1    Oct. 14, 2010

(30) Foreign Application Priority Data

Apr. 14, 2009    (JP) ................................. 2009-098115

(51) Int. Cl.
  *G02F 1/137* (2006.01)
  *G02F 1/1335* (2006.01)
  *G02F 1/135* (2006.01)
  *C09K 19/02* (2006.01)

(52) U.S. Cl. ............... 349/35; 349/12; 349/25; 349/169
(58) Field of Classification Search ............. 349/33–35, 349/169, 24–25, 12
See application file for complete search history.

(56) References Cited

U.S. PATENT DOCUMENTS

| | | | |
|---|---|---|---|
| 2005/0179678 A1* | 8/2005 | Nose et al. | 345/204 |
| 2007/0268416 A1* | 11/2007 | Harada et al. | 349/2 |
| 2008/0192157 A1* | 8/2008 | Gan et al. | 349/25 |

FOREIGN PATENT DOCUMENTS

| | | |
|---|---|---|
| JP | A-11-237644 | 8/1999 |
| JP | A-2004-117809 | 4/2004 |
| JP | A-2005-196062 | 7/2005 |
| JP | A-2007-101781 | 4/2007 |

* cited by examiner

*Primary Examiner* — Mark Robinson
*Assistant Examiner* — Dennis Y Kim
(74) *Attorney, Agent, or Firm* — Oliff & Berridge, PLC

(57) ABSTRACT

A recording device includes: a voltage application unit that applies a voltage exceeding a first threshold value to a display medium; a photosensitive layer in which an impedance changes depending on an irradiated light; and a light irradiation unit that irradiates light of a first intensity that changes the impedance of the display medium at the approximately same time as when the voltage is applied by the voltage application unit and, and when the voltage is no longer applied by the voltage application unit, irradiates light that has a second intensity lower than the first intensity and that damps the residual voltage to the second threshold value or below within a length of time equal to or less than the third threshold value.

4 Claims, 5 Drawing Sheets

P:PLANAR ORIENTATION  F:FOCAL-CONIC ORIENTATION
H:HOMEOTROPIC ORIENTATION

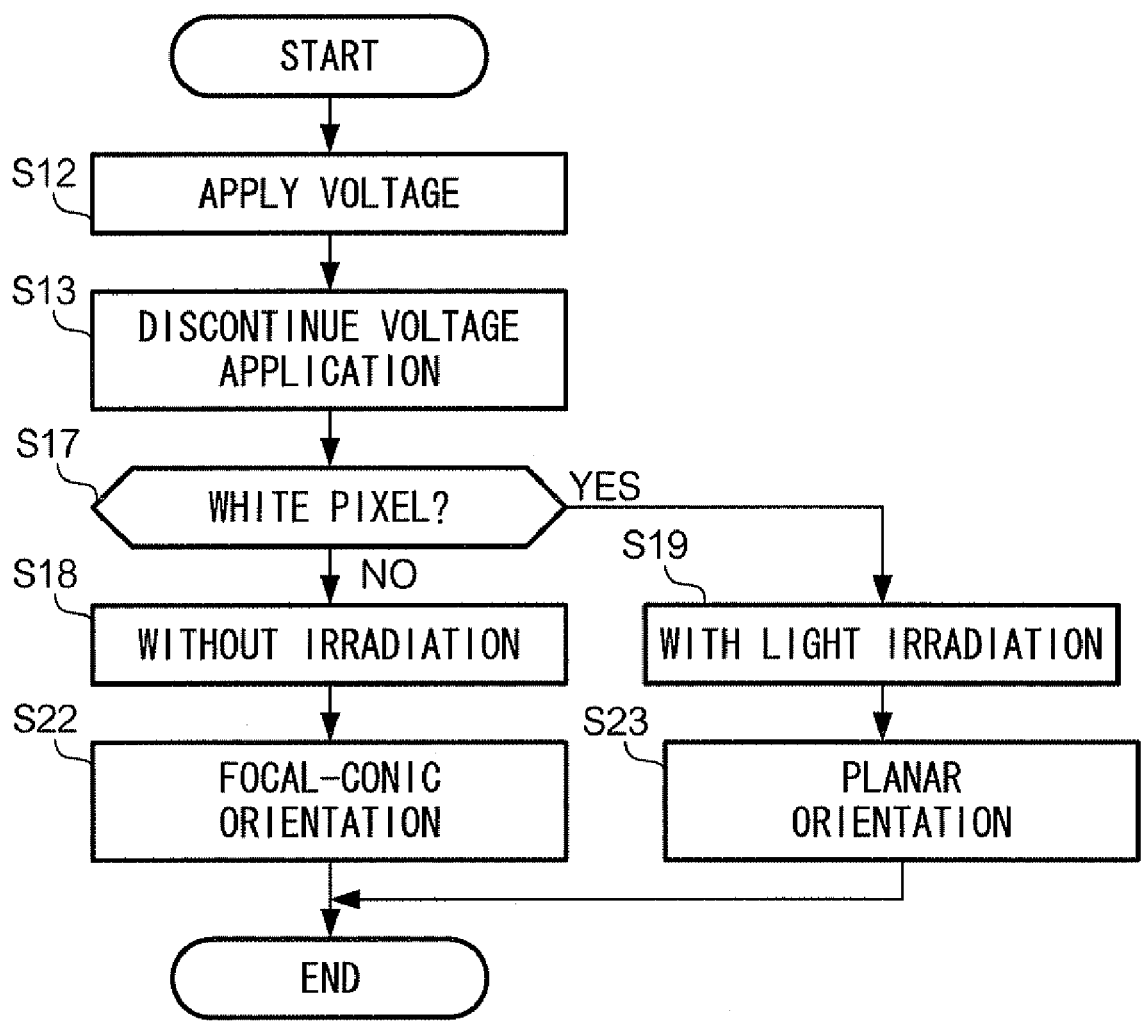

RECORDING DEVICE, RECORDING APPARATUS, AND RECORDING METHOD COMPRISING LIQUID CRYSTALS AND A PHOTOSENSITIVE LAYER IN WHICH AN IMPEDANCE CHANGES DEPENDING ON AN IRRADIATED LIGHT

CROSS-REFERENCE TO RELATED APPLICATIONS

This application claims priority under 35 USC 119 from a Japanese patent application No. 2009-098115 filed on Apr. 14, 2009.

BACKGROUND

1. Technical Field

The present invention relates to a recording device, a recording system, and a recording method.

2. Related Art

There is known in the art recording media referred to as electronic paper. One of the properties of electronic paper is that displayed content can be retained without imparting energy by applying a voltage, etc. Various technologies for renewing a content displayed on an electronic paper depending on a structure of the electronic paper are known.

SUMMARY

The present invention provides a driving method characterized by a recording media that, contains a deadband region that is wider than a light irradiation (area) of a low-light region.

According to one aspect of the invention, there is provided a recording device including: a voltage application unit that applies a voltage exceeding a first threshold value to a display medium including: liquid crystals that are oriented in a first orientation when the voltage exceeding the first threshold value is applied, that change to a second orientation different from the first orientation if the voltage applied after the first orientation is formed exceeds a second threshold value for a period that meets or exceeds a third threshold value, and that change to a third orientation with a light reflectance different from the second orientation if the voltage applied after the first orientation is formed exceeds the second threshold value for a period that does not meet the third threshold value; a photosensitive layer in which an impedance changes depending on an irradiated light; and a light irradiation unit that irradiates light of a first intensity that changes the impedance of the display medium at approximately the same time as when the voltage is applied by the voltage application unit and, and when the voltage is no longer applied by the voltage application unit, irradiates light that has a second intensity lower than the first intensity and that damps the residual voltage to the second threshold value or below within a length of time equal to or less than the third threshold value

BRIEF DESCRIPTION OF THE DRAWINGS

Exemplary embodiments of the present invention will be described in detail based on the following figures, wherein:

FIG. 4 is a flowchart showing an operation of the recording device 100;

DETAILED DESCRIPTION

1. Configuration
1-1. The Recording Device 100

Figure 1:
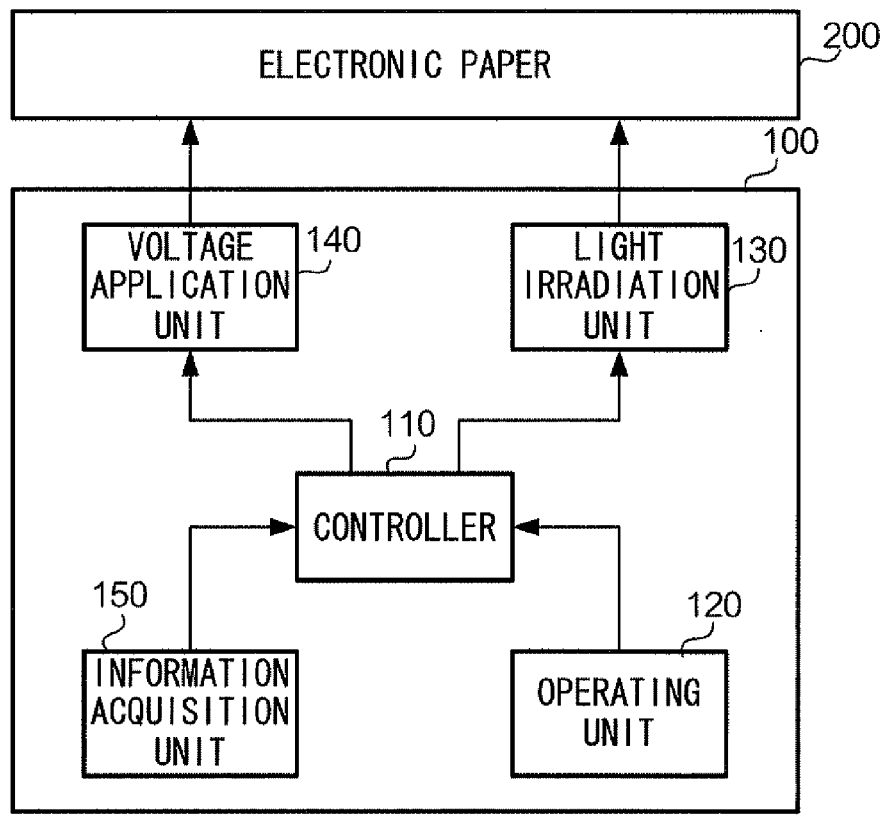
FIG. 1 is a block diagram showing the configuration of the recording device 100 of an exemplary embodiment.

FIG. 1 is a block diagram showing a configuration of a recording device 100 in accordance with an exemplary embodiment of the present invention. The recording device 100 is a device that records images according to image information on an electronic paper 200. The recording device 100 includes a controller 110, an operating unit 120, a light irradiation unit 130, a voltage application unit 140, and an information acquisition unit 150.

The controller 110 includes a processor, such as a CPU (Central Processing Unit), and a memory. The controller 110 controls operations of each element of the recording device 100. The operating unit 120 includes an input device for a user to perform operations to provide instructions including selection, confirmation, cancellation, and the like. The operating unit 120 includes a touch panel, a keyboard, and the like and outputs information indicating details of the operations to the controller 110.

The light irradiation unit 130 includes a light source that irradiates light to the electronic paper 200. The light used for recording images on the electronic paper 200 is hereinafter referred to as "recording light". The light source is, for example, a semiconductor laser diode. The light from the light source is reflected by a rotating reflector, such as a polygon mirror, and is focused by a lens. The light that has been focused into a spot in this manner is irradiated to pixels, which are units used for displaying images on the electronic paper 200. The light irradiation unit 130 scans the spot of light on the electronic paper 200 while being controlled by the controller 110. In another exemplary embodiment, the light source may be an LED (Light Emitting Diode) array in which multiple LEDs are arranged in lines. Alternatively, an LCD panel that selectively allows transmission of a backlight or light from the backlight may be used as the light source.

The voltage application unit 140 applies a voltage to the electronic paper 200 through an electrode (not shown in the figures) under the control of the controller 110. The voltage used for recording (writing) images on the electronic paper 200 is hereinafter referred to as "recording voltage". The recording device 100 has a configuration that is capable of retaining the electronic paper 200. When the electronic paper 200 is retained, the recording device 100 applies a voltage and irradiates light to the electronic paper 200. The controller 110 controls the voltage application unit 140 to apply the recording voltage at the same time that the light irradiation unit 130 irradiates the recording light.

The information acquisition unit 150 acquires various information, such as a control program or image information representing an image, from memories and external devices that are not shown. In this example, information is obtained from external devices using wired and wireless communication. The method for acquiring various information from an external device is not limited to communication and may be an interface for acquiring information from a semiconductor memory, such as a USB memory or a memory card, or an optical disc, such as a CD or DVD.

1-2. The Electronic Paper 200

Figure 2:
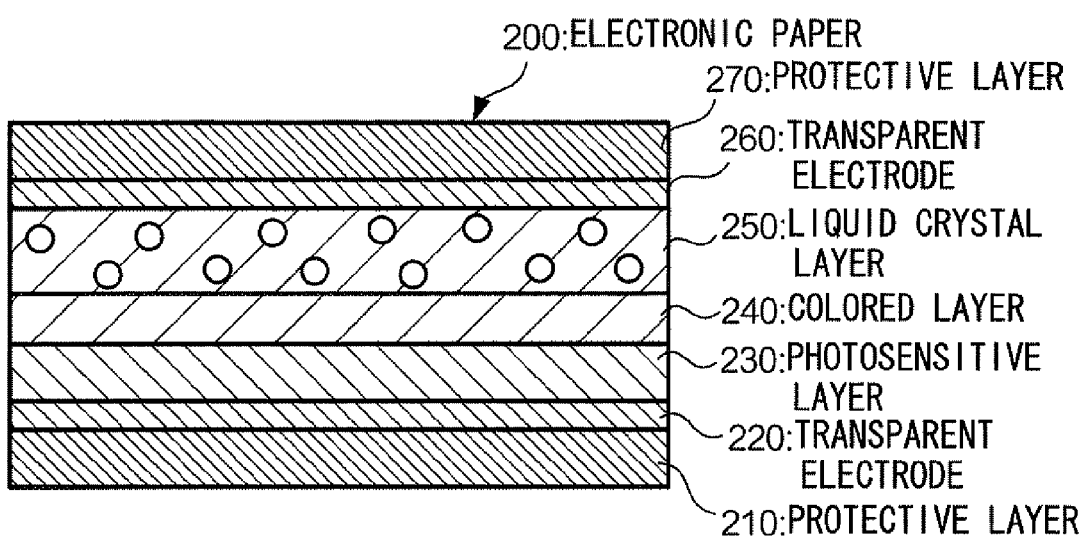
FIG. 2 is a diagram showing the configuration of the electronic paper 200.

FIG. 2 is a diagram showing a configuration of the electronic paper 200. The electronic paper 200 is an example of an optically writable display medium. The electronic paper 200 includes a protective layer 210 and a protective layer 270, a transparent electrode 220 and a transparent electrode 260, a photosensitive layer 230, a colored layer 240, and a liquid crystal layer 250, and the display screen on which images are displayed is composed of these components.

The protective layer 210 and the protective layer 270 are layers for protecting the surface of the electronic paper 200. The protective layer 210 and the protective layer 270 are composed of, for example, PET (polyethylene terephthalate). The protective layer 210 is installed on the side (back surface) that is irradiated with light by the recording device 100. The protective layer 270 is installed on the side (front surface) on which the user observes a written image. The transparent electrode 220 and the transparent electrode 260 are layers composed of for example, ITO (indium tin oxide). A voltage is applied between the transparent electrode 220 and the transparent electrode 260 by the recording device 100.

The photosensitive layer 230 is a layer in which the impedance (or electric conductivity) changes in accordance with the irradiated light. An organic photoconductor (OPC), for example, is used for the photosensitive layer 230. When a light of a specific wavelength is irradiated to the photosensitive layer 230, an electrical charge is generated and a resistance lower than that in a state of darkness is obtained, and the voltage applied to the liquid crystal layer 250 is thereby increased. The layer containing the photosensitive layer 230 and the liquid crystal layer 250 is hereinafter referred to as "display layer" as necessary.

The colored layer 240 is a layer that is observed when the liquid crystal layer 250 transmits light. In this example, the colored layer 240 is black. The colored layer 240 is not an essential component, and for example, incoming light may be absorbed by the photosensitive layer 230.

The liquid crystal layer 250 includes molecules of liquid crystals, such as cholesteric liquid crystals, that change in orientation depending on the energy applied through a voltage or the like. The liquid crystal layer 250 is formed by dispersing microcapsule-shaped cholesteric liquid crystals in binder resin. Orientations of the cholesteric liquid crystals mainly include a planar orientation (an example of the third orientation), a focal-conic orientation (an example of the second orientation), and a homeotropic orientation (an example of the first orientation). The planar orientation and the focal-conic orientation are thermally stable states, wherein the orientation is maintained even when no electric field is applied to provide energy. In other words, the cholesteric liquid crystals are bistable materials that are stable in a planar orientation and a focal-conic orientation. In the planar orientation, light of a specific wavelength is reflected. In the focal-conic orientation, light is transmitted. The electronic paper 200 forms images by using these differences in reflectance.

Figure 3:
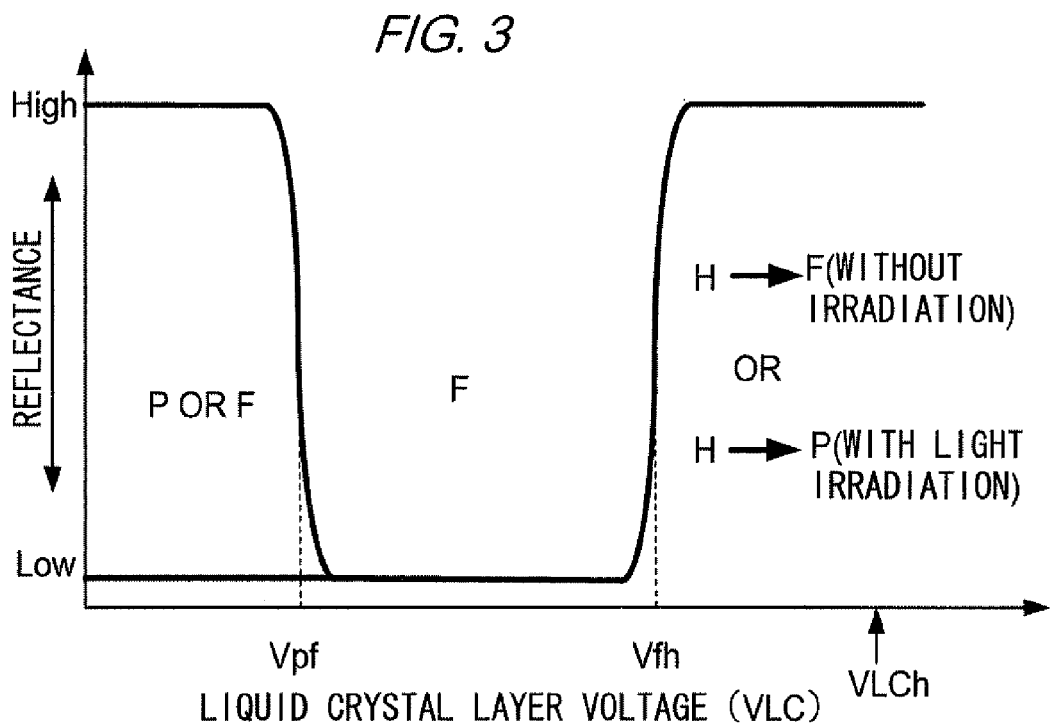
FIG. 3 is a diagram showing an example of the reflectance characteristics of the liquid crystal layer 250.

FIG. 3 is a diagram showing an example of the reflectance characteristics of the liquid crystal layer 250. In FIG. 3, the vertical axis indicates the reflectance of the liquid crystal layer 250 and the horizontal axis indicates the voltage applied to the liquid crystal layer 250.

The orientation of the cholesteric liquid crystals changes according to the voltage applied to the liquid crystals. In the example of FIG. 3, when the voltage V applied to the liquid crystal layer 250 is within the range of 0<V<Vpf, the orientation does not change. When the voltage V applied to the liquid crystal layer 250 is within the range of Vpf<V<Vfh, the orientation changes into a focal-conic orientation. In other words, if the orientation is a planar orientation before the voltage is applied, it transitions into a focal-conic orientation. If the orientation is a focal-conic orientation before the voltage is applied, the focal-conic orientation is maintained. When the voltage V applied to the liquid crystal layer 250 is greater than Vfh (Vfh being an example of the first threshold value), the orientation changes into a homeotropic orientation.

The homeotropic orientation is thermally unstable, and if the application of the voltage exceeding Vfh is discontinued, the homeotropic orientation transitions into a planar orientation or a focal-conic orientation. Whether the orientation becomes a planar orientation or a focal-conic orientation depends on the length of time from when the application of the voltage exceeding Vfh is discontinued to when the voltage applied to the liquid crystal layer 250 nears zero.

2. Operation

FIG. 4 is a flowchart showing an operation of the recording device 100. When instructions to record an image are sent through operations of the operating unit 120 while the electronic paper 200 is retained by the recording device 100, the controller 110 starts a process for recording an image on the electronic paper 200.

First, the recording device 100 performs a reset process for the electronic paper 200. In this example, the reset process refers to orienting the pixels of all regions of the liquid crystal layer 250 of the electronic paper 200 in a homeotropic orientation (homeotropic reset). In the reset process, first, the controller 110 controls the light irradiation unit 130 to irradiate light to the electronic paper 200. In this state, the resistance of the photosensitive layer 230 decreases and a desired voltage is applied to the liquid crystal layer 250. At the same time as this light irradiation, the controller 110 applies the voltage exceeding Vfh shown in FIG. 3 (hereinafter, "reset voltage") to the liquid crystal layer (step S12). Consequently, all regions of the liquid crystal layer 250 are oriented in a homeotropic orientation. When the reset voltage has been applied for a predetermined length of time, the controller 110 controls the voltage application unit 140 to discontinue the application of the voltage (step S13).

Next, the controller 110 performs a selection process. The selection process refers to a process for writing an image corresponding to image information onto the electronic paper 200, and specifically refers to the controller 110 controlling the light irradiation unit 130 to irradiate light corresponding to the image information.

In this example, the image information includes, for example, two tones of pixels that are black and white. The liquid crystal layer is driven so that the regions within the liquid crystal layer 250 corresponding to the black pixels have a focal-conic orientation and the regions corresponding to the white pixels have a planar orientation. In this example, the image information includes the two tones of black and white, but the method of expression of the image information is not limited to this. For example, the image information may be expressed through the two colors of black and red. Alternatively, three display layers (e.g., red, green, and blue) that each reflects different light wavelengths may be layered to provide a color display.

In step S17, based on the image information, the controller 110 determines whether the tone value of the pixel subject to processing (hereinafter, "processed pixel") is white. If the tone value of the processed pixel is black (step S17: NO), the controller 110 shifts the process to step S18. If the tone value of the processed pixel is white (step S17: YES), the controller 110 shifts the process to step S19.

In step S18, the controller 110 controls the light irradiation unit 130 so that light is not irradiated. At this time, in the display layer, the resistance of the photosensitive layer 230 increases and residual voltage is generated by the residual electrical charge.

Figure 5:
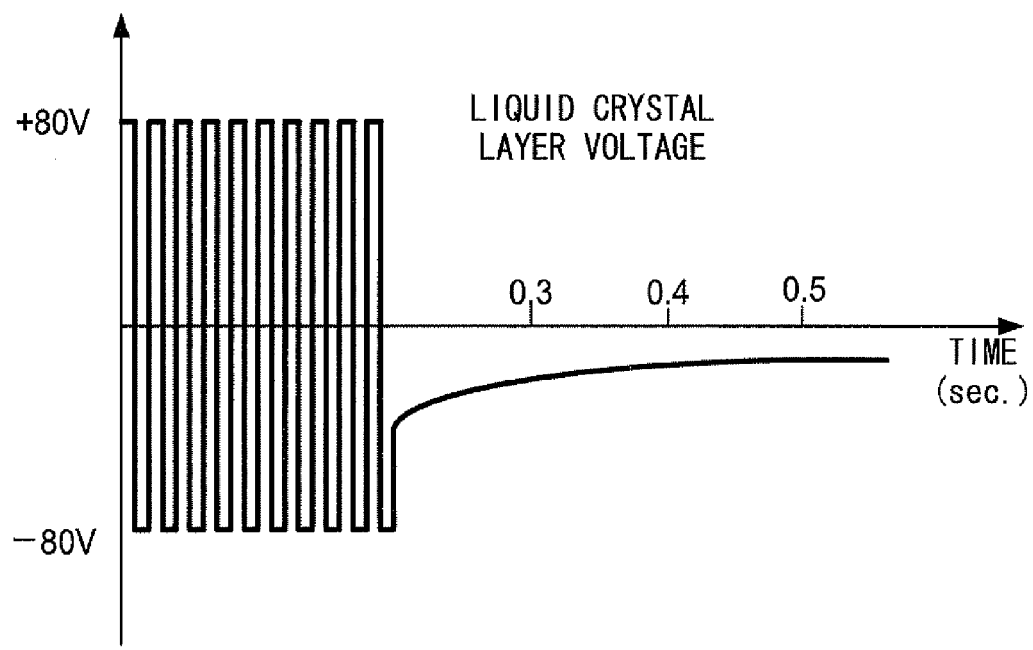
FIG. 5 is a diagram showing an example of a residual voltage applied to the liquid crystal layer 250 when no light is irradiated.

FIG. 5 is a diagram showing an example of a residual voltage applied to the liquid crystal layer 250 in step S18 (no light irradiation). The vertical axis represents the voltage applied to the liquid crystal layer 250 and the horizontal axis represents time. In this example, a voltage of ±80V is applied at 50 Hz as the recording voltage. As a result of the application of the recording voltage, the orientation of the liquid crystal layer 250 becomes a homeotropic orientation. In this example, after the recording voltage is turned off, a residual voltage of approximately 40V is generated. The generated residual voltage decreases by half in approximately 100 to 150 msec. (milliseconds) and is gradually damped. Whether the orientation becomes a planar orientation or a focal-conic orientation after the application of the recording voltage is discontinued depends on the waveform of the residual voltage; more specifically, it is determined according to the length of time during which the residual voltage exceeded a specific threshold voltage (an example of the second threshold value). In this example, the liquid crystal layer 250 and the photosensitive layer 230 are designed so that the length of time during which the residual voltage exceeds the threshold voltage is equal to or greater than a threshold time (an example of the third threshold value), and after the recording voltage is turned off, the liquid crystal layer 250 is oriented in a focal-conic orientation (step S22 in FIG. 4).

The following description refers again to FIG. 4. In step S19, the light irradiation unit 130 is controlled to irradiate light. At this time, in the display layer, the resistance of the photosensitive layer 230 decreases compared to the resistance in step S18 and the generated residual voltage is lower than that generated in step S18. The light irradiated in this step (hereinafter, "secondary light") has a lower intensity than the light irradiated according to the application of the recording voltage (hereinafter, "primary light"). For example, the intensity of the secondary light is 1/100 or less of the intensity of the primary light. Moreover, the secondary light is irradiated immediately after the application of the recording voltage is discontinued. "Immediately after the application of the recording voltage is discontinued" refers to a short length of time sufficient for eliminating the residual voltage.

Figure 6:
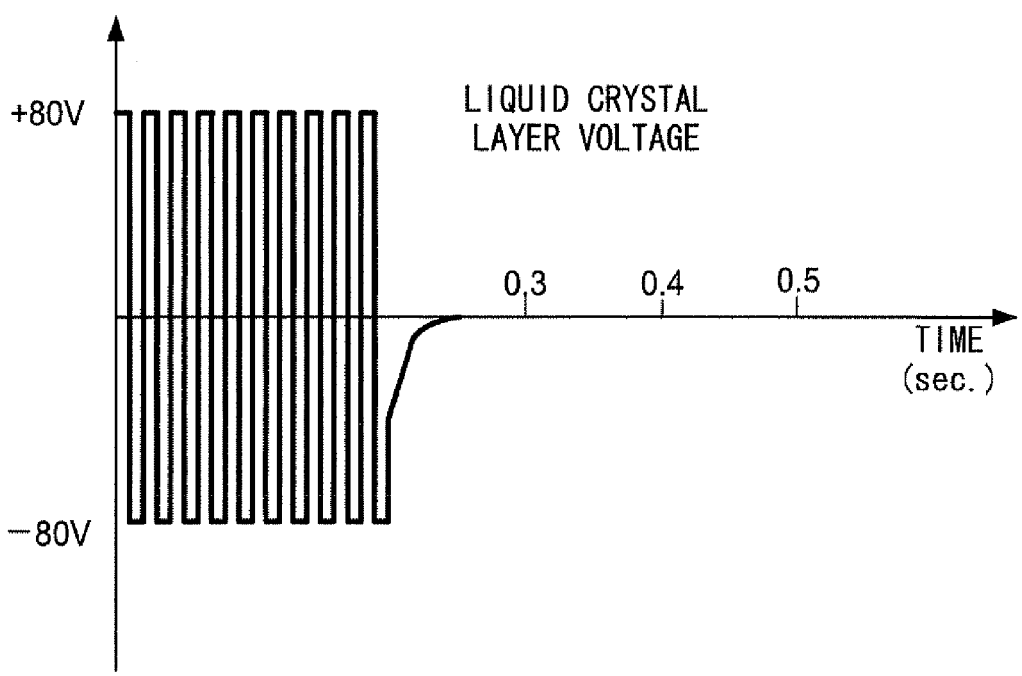
FIG. 6 is a diagram showing an example of a residual voltage applied to a display layer when light is irradiated.

FIG. 6 is a diagram showing an example of a residual voltage applied to the liquid crystal layer 250 in step S19 (with light irradiation). In this example, as in the example of FIG. 5, a voltage of ±80 V is applied at 50 Hz as the recording voltage. After the recording voltage is turned off, a residual voltage of approximately 40 V is generated, but the residual voltage is rapidly damped in around 10 msec. by light irradiation. In this example, the liquid crystal layer 250 and the photosensitive layer 230 are designed so that the length of time during which the residual voltage exceeds a threshold value is less than another threshold value, and after the recording voltage is turned off, the liquid crystal layer 250 is oriented in a planar orientation (step S23 in FIG. 4).

Figure 7:
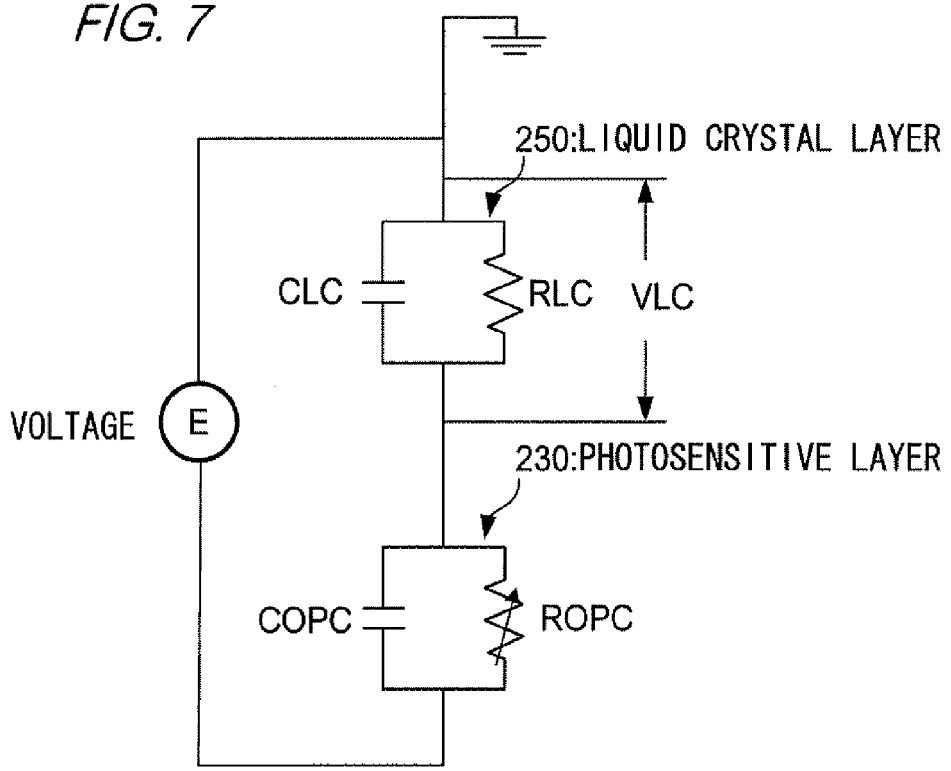
FIG. 7 is a diagram showing an example of an equivalent circuit of the electronic paper 200.

FIG. 7 is a diagram showing an example of an equivalent circuit of the electronic paper 200. In the equivalent circuit, the liquid crystal layer 250 is represented by resistance RLC and capacity CLC connected in parallel and the photosensitive layer 230 is represented by resistance ROPC and capacity COPC connected in parallel. The photosensitive layer 230 and the liquid crystal layer 250 are connected in series. A voltage±E is applied at frequency f to the photosensitive layer 230 and the liquid crystal layer 250. Voltage VLC is applied to the liquid crystal layer 250. Resistance ROPC of the photosensitive layer 230 is decreased by the irradiation of light.

As shown in the following Formula (1), damping of residual voltage Vt of the liquid crystal layer 250 is determined by time constant τ.

$$V_t = V_{LC} e^{-t/\tau} \quad (1)$$

In this formula, time constant τ is dependent on the ROPC, wherein τ decreases if the ROPC decreases. In other words, if the ROPC is decreased by an irradiation of light, residual voltage Vt is rapidly damped.

If the driving time is sufficiently long, voltage VLC converges as shown in the following Formula (2). Using the following Formula (2), the structures of the liquid crystal layer 250 and the photosensitive layer 230 can be designed.

$$V_{LC} \approx \frac{ER'(1 - e^{-1/2f\tau}) - EC'(1 - e^{-1/2f\tau})}{1 - e^{-1/2f\tau}} \quad (2)$$

$$\because \tau = (C_{LC} + C_{OPC}) \cdot \frac{R_{LC} \cdot R_{OPC}}{R_{LC} + R_{OPC}}$$

$$\because R' = \frac{R_{LC}}{R_{LC} + R_{OPC}}$$

$$\because C' = \frac{C_{OPC}}{C_{LC} + C_{OPC}}$$

As the ROPC decreases if the primary light is irradiated, the voltage applied to the liquid crystal layer 250 increases and an electrical discharge is accumulated in the liquid crystal layer. If the irradiation of the primary light is then discontinued, the ROPC increases and time constant τ becomes longer (or increases). In other words, compared to when the primary light is not irradiated, the residual voltage increases.

Figure 8A:
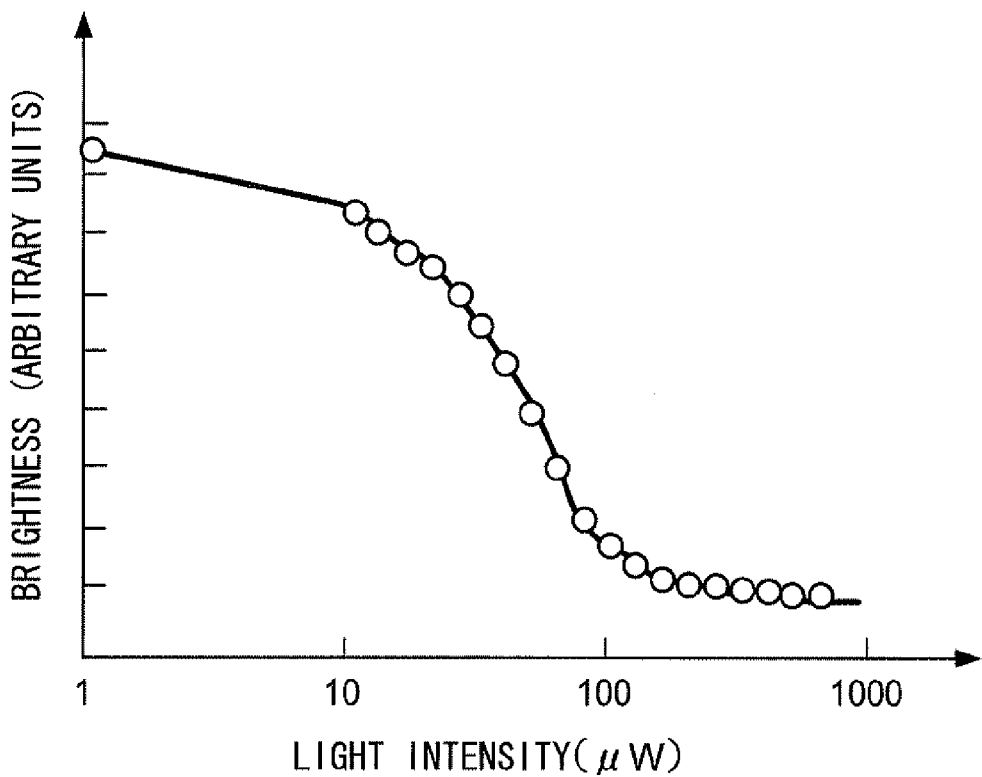
FIG. 8A shows an example of a conventional planar reset method that does not use tonal control based on the irradiation of secondary light.
Figure 8B:
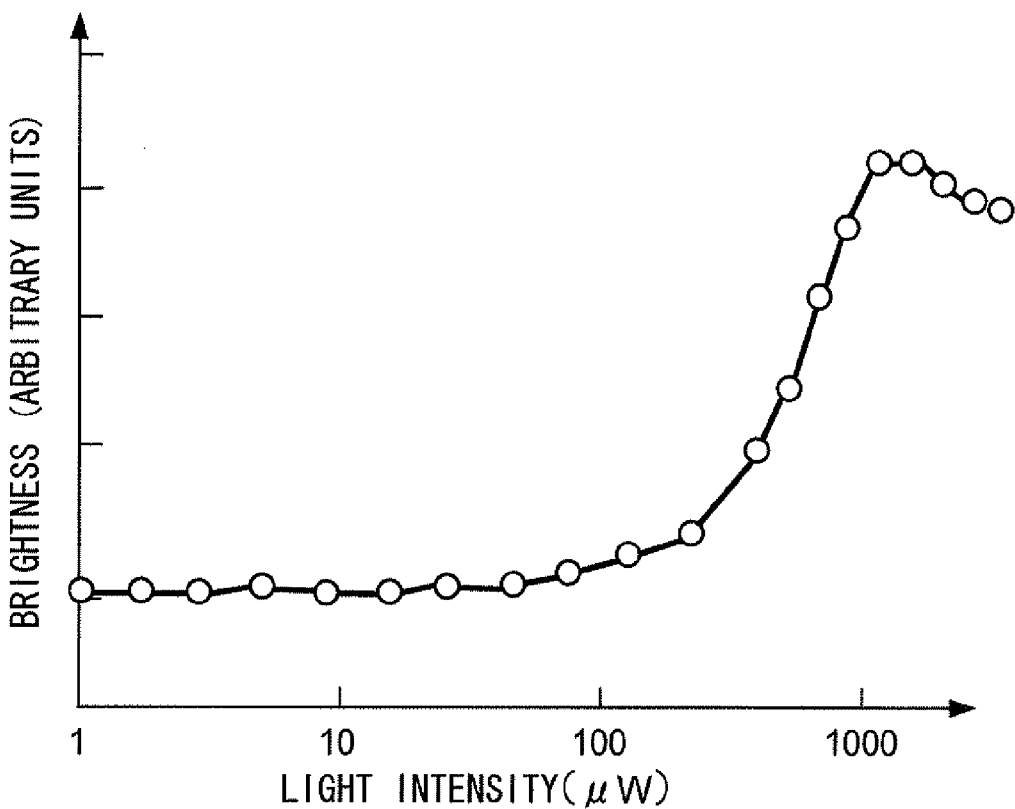
FIG. 8B shows an example in which tonal control based on the irradiation of secondary light is used.

FIGS. 8A and 8B is a diagram showing an example of a deadband for a leaking light. In this example, the vertical axis represents the brightness (reflectance) of the liquid crystal layer 250 and the horizontal axis represents the quantity of light irradiated to the liquid crystal layer 250. "Leaking light" refers to light that is not intentionally irradiated to the liquid crystal layer 250 like recording light (primary light, secondary light) but rather is light that is unintentionally irradiated to the liquid crystal layer 250, such as light used for writing adjacent pixels and light from the surrounding environment. FIG. 8A shows an example of a conventional planar reset method that does not use tonal control based on the irradiation of secondary light, and FIG. 8B shows an example in which tonal control based on the irradiation of secondary light is used.

In the example of FIG. 8A, if, for example, approximately 10 μW (microwatts) of light were irradiated, the brightness would decrease by approximately 10%. In addition, if approximately 100 μW (microwatts) of light were irradiated, the brightness would decrease by approximately 90%. In contrast, if tonal control based on the irradiation of secondary light of the present exemplary embodiment is used, the irradiation of approximately 10 μW (microwatts) of light results in almost no change in brightness and the irradiation of approximately 100 μW (microwatts) of light results only in an increase in brightness of approximately 10% or more, and changes in brightness due to low quantities of light are controlled. As shown in the example of FIG. 8B, if the tone is controlled using the irradiation of secondary light, the deadbands (regions with almost no change in brightness) of regions of low light quantity are expanded compared to when tonal control based on the irradiation of secondary light is not used. As described above, according to the present exemplary embodiment, by using a voltage signal (recording voltage) and light signals (primary light, secondary light), the deadbands of regions of low light quantity can be expanded compared to when tonal control based on the irradiation of secondary light is not used.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. A recording device, comprising:
a voltage application unit that applies a voltage exceeding a first threshold value to a display medium including: liquid crystals that are oriented in a first orientation when the voltage exceeding the first threshold value is applied, that change to a second orientation different from the first orientation if the voltage applied after the first orientation is formed exceeds a second threshold value for a period that meets or exceeds a third threshold value, and that change to a third orientation with a light reflectance different from the second orientation if the voltage applied after the first orientation is formed exceeds the second threshold value for a period that does not meet the third threshold value;
a photosensitive layer in which an impedance changes depending on an irradiated light; and
a light irradiation unit that irradiates light of a first intensity that changes the impedance of the display medium at approximately the same time as when the voltage is applied by the voltage application unit and, when the voltage is no longer applied by the voltage application unit, irradiates light that has a second intensity lower than the first intensity and that damps a residual voltage to the second threshold value or below within a length of time equal to or less than the third threshold value.

2. The recording device of claim 1,
wherein when the period of time during which the residual voltage exceeds the second threshold value meets or exceeds the third threshold value, the liquid crystals layer is oriented in a focal-conic orientation, and
wherein when the period of time during which the residual voltage exceeds the second threshold value does not meet the third threshold value, the liquid crystal layer is oriented in a planar orientation.

3. A recording apparatus, comprising:
a display medium containing: liquid crystal's that are oriented in a first orientation when a voltage exceeding a first threshold value is applied, that change to a second orientation that differs from the first orientation if the voltage applied after the first orientation is formed exceeds a second threshold value for a period that meets or exceeds a third threshold value, and that change to a third orientation with a light reflectance different from the second orientation if the voltage applied after the first orientation is formed exceeds the second threshold value for a period that does not meet the third threshold value; and
a photosensitive layer in which an impedance changes depending on an irradiated light; and
a recording device containing:
a voltage application unit that applies a voltage exceeding the first threshold value to the display medium; and
a light irradiation unit that irradiates light at a first intensity that changes the impedance of the display medium at approximately the same as when the voltage is applied by the voltage application unit and, when the voltage is no longer applied by the voltage application unit, irradiates light that has a second intensity lower than the first intensity and that damps a residual voltage to the second threshold value or below within a length of time equal to or less than the third threshold value.

4. A recording method, comprising:
applying a voltage exceeding a first threshold value to a display medium containing: liquid crystals that are oriented in a first orientation when the voltage exceeding the first threshold value is applied, that change to a second orientation that differs from the first orientation if the voltage applied after the first orientation is formed exceeds a second threshold value for a period that meets or exceeds a third threshold value, and that change to a third orientation with a different light reflectance from the second orientation if the voltage applied after the first orientation is formed exceeds the second threshold value for a period that does not meet the third threshold value; and a photosensitive layer in which an impedance changes depending on an irradiated light; and
irradiating, approximately at the same time that the voltage is applied, light at a first intensity that changes the impedance of the recording medium; and irradiating, when the voltage is no longer applied, light that has a second intensity lower than the first intensity and that damps a residual voltage to the second threshold value or below within a length of time equal to or less than the third threshold value.

* * * * *